United States Patent [19]

Thies

[11] 3,731,284

[45] May 1, 1973

[54] METHOD AND APPARATUS FOR REORDERING DATA

[75] Inventor: Fred Walter Thies, Greensboro, N.C.

[73] Assignee: Bell Telephone Laboratories, Incorporated, Murray Hill, Berkeley Heights, N.J.

[22] Filed: Dec. 27, 1971

[21] Appl. No.: 211,882

[52] U.S. Cl. ..........340/172.5

[51] Int. Cl. ..........G06f 9/20, G06f 7/00

[58] Field of Search ..........340/172.5; 235/156; 178/22

[56] References Cited

UNITED STATES PATENTS

| | | | |
|---|---|---|---|
| 3,440,618 | 4/1969 | Chinlund | 340/172.5 |
| 3,564,505 | 2/1971 | Finnila | 340/172.5 |
| 3,584,781 | 6/1971 | Edson | 340/172.5 X |
| 3,633,173 | 1/1972 | Edge | 340/172.5 |
| 3,591,784 | 7/1971 | Cutter | 235/156 X |
| 3,601,592 | 8/1971 | Cutter | 235/156 |
| 3,517,173 | 6/1970 | Gilmartin | 235/156 |
| 3,673,399 | 6/1972 | Hancke | 235/156 |

*Primary Examiner*—Paul J. Henon
*Assistant Examiner*—Sydney R. Chirlin
*Attorney*—R. J. Guenther et al.

[57] ABSTRACT

A reordering method and associated apparatus for storing and accessing samples of a physical process to facilitate the generation of Fourier series coefficients is disclosed. In particular, methods and apparatus for generating storage and retrieval patterns for a sequence of sampled data for facilitating the computation of fast Fourier transformation (FFT) of a plurality of overlapped records is disclosed.

13 Claims, 24 Drawing Figures

FIG. 1A
UNSCRAMBLED SEQUENCE
| | | | | |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |
| 11 | 1 | 0 | 1 | 1 |
| 12 | 1 | 1 | 0 | 0 |
| 13 | 1 | 1 | 0 | 1 |
| 14 | 1 | 1 | 1 | 0 |
| 15 | 1 | 1 | 1 | 1 |
FIG. 1B
SCRAMBLED SEQUENCE
| | | | | |
|---|---|---|---|---|
| 0 | 0 | 0 | 0 | 0 |
| 8 | 1 | 0 | 0 | 0 |
| 4 | 0 | 1 | 0 | 0 |
| 12 | 1 | 1 | 0 | 0 |
| 2 | 0 | 0 | 1 | 0 |
| 10 | 1 | 0 | 1 | 0 |
| 6 | 0 | 1 | 1 | 0 |
| 14 | 1 | 1 | 1 | 0 |
| 1 | 0 | 0 | 0 | 1 |
| 9 | 1 | 0 | 0 | 1 |
| 5 | 0 | 1 | 0 | 1 |
| 13 | 1 | 1 | 0 | 1 |
| 3 | 0 | 0 | 1 | 1 |
| 11 | 1 | 0 | 1 | 1 |
| 7 | 0 | 1 | 1 | 1 |
| 15 | 1 | 1 | 1 | 1 |
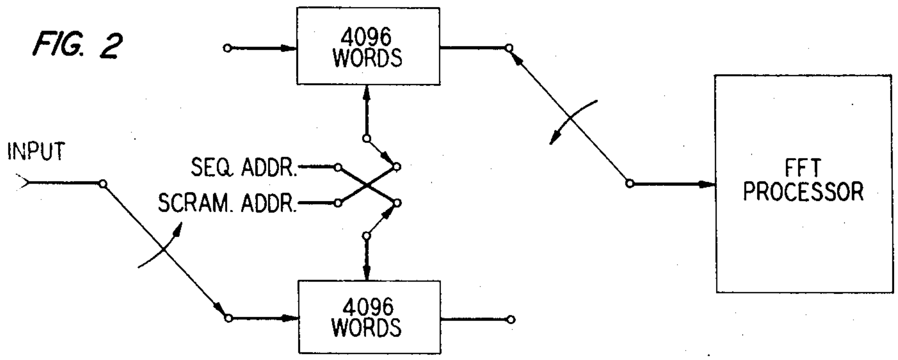
FIG. 2
FIG. 3
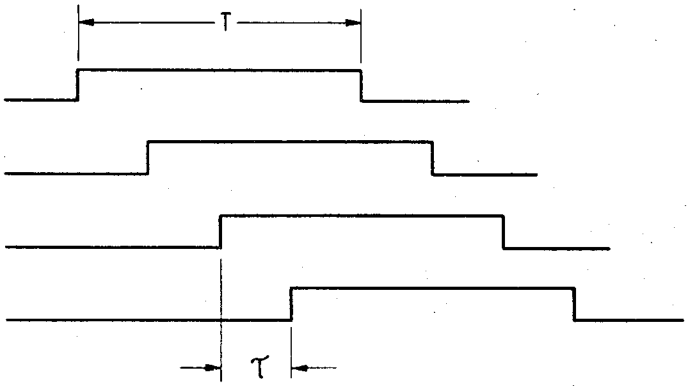

FIG. 5
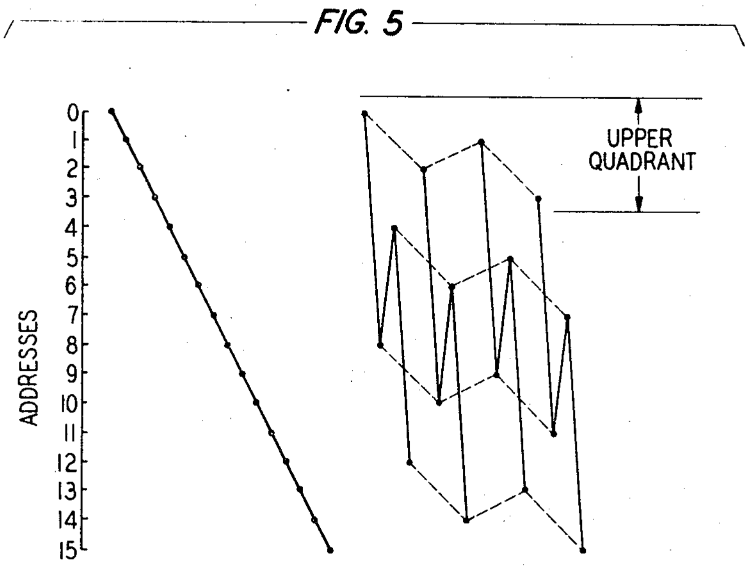
FIG. 7A
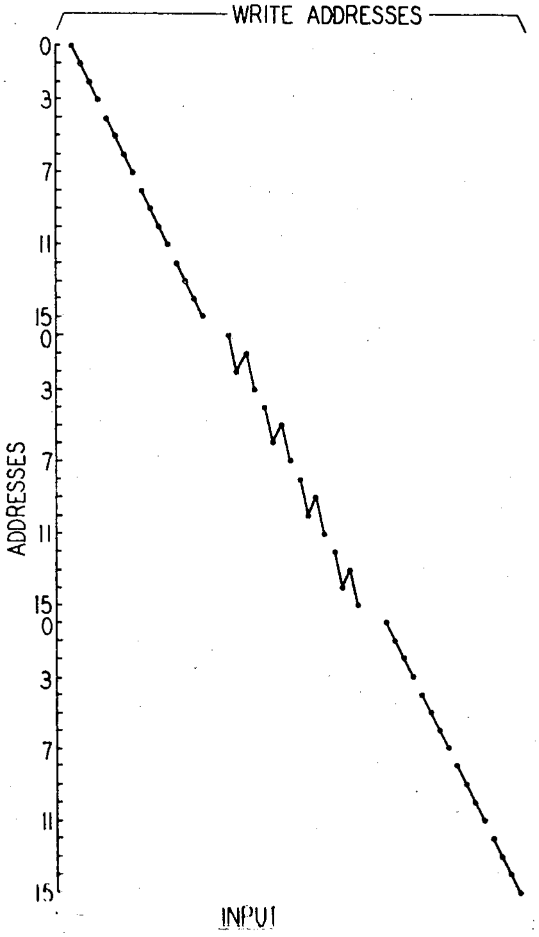
FIG. 6
| | | | | |
|---|---|---|---|---|
| 0 | 0 | 0 | 0 | 0 |
| 2 | 0 | 0 | 1 | 0 |
| 1 | 0 | 0 | 0 | 1 |
| 3 | 0 | 0 | 1 | 1 |
| 4 | 0 | 1 | 0 | 0 |
| 6 | 0 | 1 | 1 | 0 |
| 5 | 0 | 1 | 0 | 1 |
| 7 | 0 | 1 | 1 | 1 |
| 8 | 1 | 0 | 0 | 0 |
| 10 | 1 | 0 | 1 | 0 |
| 9 | 1 | 0 | 0 | 1 |
| 11 | 1 | 0 | 1 | 1 |
| 12 | 1 | 1 | 0 | 0 |
| 14 | 1 | 1 | 1 | 0 |
| 13 | 1 | 1 | 0 | 1 |
| 15 | 1 | 1 | 1 | 1 |
N BITS
N-2 BITS

METHOD AND APPARATUS FOR REORDERING DATA

GOVERNMENT CONTRACT

The invention herein claimed was made in the course of or under a contract with the Department of the Navy.

BACKGROUND OF THE INVENTION

1. Field of the Invention

The present invention relates to data processing techniques for processing signals with respect to their frequency content. More specifically, the present invention relates to data processing apparatus and techniques involving the fast Fourier transform. Still more particularly, the present invention relates to techniques for preprocessing data samples with respect to format and ordering before they are processed by otherwise well-known fast Fourier transform techniques.

2. Prior Art

The well-known fast Fourier transform (FFT) techniques have been applied to a wide range of signal analysis problems. Particular apparatus and methods for performing the fast Fourier transform have taken many different forms. A summary describing several of the most popular configurations is contained, for example, in "Fast Fourier Transform Hardware Implementations" by G. D. Bergland, *IEEE Trans. Audio and Electroacoustics*, Vol. AU-17, June, 1969 pp. 104–108. Another useful reference is Cochran, et al., "What is the Fast Fourier Transform," *IEEE Trans. Audio and Electroacoustics*, June 1967, pp. 45–55. Another reference describing various features of the FFT is Gentleman and Sande, "Fast Fourier Transforms for Fun and Profit," *Proc. AFIPS FJCC*, Vol. 29, Washington, D.C., Spartan, 1966, pp. 563–578.

One particular form of fast Fourier transform apparatus which has been found to be of importance is the so-called "cascade" or "pipeline" processor, described, for example, in Bergland and Hale, "Digital Real-Time Spectral Analysis," *IEEE Trans. Electronic Computers*, Vol. EC-16, pp. 180–185, April 1967, and in U. S. Pat. No. 3,544,775 issued to G. D. Bergland et al. on Dec. 10, 1970; U.S. Pat. No. 3,588,460 issued June 28, 1971 to R. A. Smith; U.S. Pat. No. 3,584,782 issued June 15, 1971 to G. D. Bergland; and U.S. Pat. No. 3,584,781 issued June 15, 1971 to J. O. Edson.

Other useful references dealing with the so-called cascade or pipeline fast Fourier transform processor include Groginsky and Works, "A Pipeline Fast Fourier Transform," 1969 *IEEE Eascon Rec.*, pp. 22–29; and O'Leary, "Nonrecursive Digital Filtering Using Cascade Fast Fourier Transformers," *IEEE Trans. on Audio and Electroacoustics*, June 1970, pp. 177–183.

It has been recognized in the prior art FFT systems that certain input data formatting operations permit the processing of input samples to proceed in a particularly convenient manner. Thus, in the Edson patent, supra, the so-called digits-reversed technique is applied to an original set of input samples prior to application to the cascaded arrangements shown therein. Similarly, in the Gentleman et al. paper, supra, simplifications are seen to be possible by virtue of reordering of the original input sequence. As a final example, and one to be used to illustrate the present techniques most clearly, reference is made to U.S. patent application, Ser. No. 82,572 by P. S. Fuss filed Oct. 21, 1970. In this latter application it is assumed that the digits-reversed "-scrambling" of the input sequence has been performed as a preliminary.

There are, of course, well-known, straightforward techniques for performing the above-mentioned scrambling or reordering of input sequences. The prior art techniques, however, proceed in such a manner as to require a prohibitively large amount of storage and processing to perform the required reordering.

Accordingly, it is an object of the present invention to provide for efficient hardware and methods for performing digits-reversed scrambling of an input sequence.

It has been shown in the prior art that improved results can be obtained in signal processing by performing analyses with respect to overlapped data intervals. That is, it is possible to generate results based on sequences of data samples which are not mutually exclusive, but which provide a degree of redundancy from one analysis period to another. Typical of such systems are those illustrated in U. S. Pat. No. 3,544,894 issued to W. T. Hartwell et al. on Dec. 1, 1970.

Previously described techniques for performing fast Fourier transforms have emphasized analyses with respect to independent (non-overlapping) sampling intervals.

Accordingly, it is a further object of the present invention to provide apparatus and methods for performing scrambling or reordering of input samples for fast Fourier transforming non-independent data records.

SUMMARY OF THE INVENTION

The present invention provides a buffered memory and memory addressing arrangement for achieving the above-mentioned objects. By noting the sequence in which operands are required by an FFT processor, it was found possible to segment and address a single random access memory in such manner that only a number of memory words equal to the number of samples in a record need be provided.

Non-interfering sequences of input and output addresses are generated by corresponding address generators which provide for the reading of a plurality of words for each new word stored. Thus an advantageous redundancy in consecutive memory readouts may be obtained.

These objects and features are realized in a typical embodiment of the invention providing a redundancy of four which incorporates a fundamental bit reversal circuit in combination with counting and other logic circuitry. In the write address generating circuitry, a recycling counter advanced at the input word rate drives a bit reversing circuit and a second counter. The outputs of the second counter together with the outputs of the bit reversal circuit constitute the desired write addresses. The status of the bit reversal circuit (normal or bit-reversed) is determined by the point within an input record and the readout sequence number.

Correspondingly, the readout address sequence is determined in part by a basic counter which is advanced at the readout word rate. A bit reverser responsive in part to the state of a second counter provides selective reversal of the most significant bits of the basic counter. The status of the bit reverser in the output address generator is also seen to be advantageously responsive to the overflow status of an adder which forms the sum of the low order bits of the basic counter and the entire state of the second counter. The sequence of the outputs of the bit reverser and the adder provide the desired address patterns.

Additional features of the instant invention provide for the parallel to serial conversion of the memory output and the interfacing of a buffer/scrambler with an FFT processor of well-known design.

BRIEF DESCRIPTION OF THE DRAWING

The above-mentioned and other objects and features of the present invention will be more fully understood by considering the following detailed description of an illustrative embodiment of the present invention while referring to the attached drawing wherein:

FIG. 1A shows a typical input sequence to be reordered.

FIG. 1B shows a digits-reversed reordered sequence corresponding to the sequence shown in FIG. 1A.

FIG. 2 illustrates a simple "double bucket" buffered system for reordering input sequences.

FIG. 3 illustrates the concept of redundancy of time intervals in signal processing.

FIG. 5 shows an address pattern based on the teachings of the instant invention for the case of a 16-sample record.

FIG. 6 shows sets of bit patterns associated with the addressing patterns of FIG. 5.

FIG. 7A shows the pattern of write-in addresses associated with successive 16-sample records of input data in accordance with one embodiment of the instant invention.

DETAILED DESCRIPTION

Introduction

Figure 4:
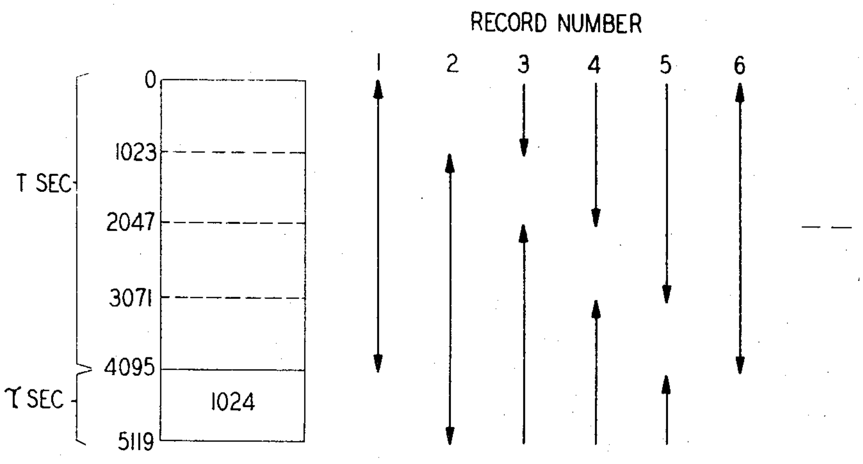
FIG. 4 illustrates a simple redundancy buffer arrangement and associated readout procedures.

FFT processors can be divided in accordance with one criterion into two basic groups: those which operate on an ordered sequence of input samples to produce a scrambled output sequence, and those which operate on a scrambled input sequence to produce an ordered output sequence. The latter type of processor has an advantage when an ordered output sequence is desired since an output unscrambling memory is not needed. In addition, it is possible to achieve the input scrambling by adding control circuitry to an input buffer memory.

To illustrate a simple scrambling operation consider the reordering of the 16-word input sequence represented by their labels or addresses (or order of occurrence in a sequence) in FIG. 1A. It is clear that the samples are in simple monotonic increasing order with respect to the labels, i.e., they are in their naturally occurring order.

The scrambled sequence shown in FIG. 1B having labels with the ordering 0, 8, 4, . . . , 7, 15, is related to the input sequence (with consecutive labels 0, 1, 2, . . . , 15) by a simple bit reversal relationship between the labels when represented in the binary domain. Thus, for example, sample 1 (0001 in binary notation) is replaced by sample 8 (1000 in binary).

One particularly simple technique for realizing this scrambling of an input sequence is to first arrange for the input sequence to merely be entered into a memory in consecutive order at corresponding consecutive locations, e.g., word 0 at address 0000, word 1 at address 0001, etc. To obtain the scrambled output sequence, the address indicating bits of a memory access register are reversed such that word zero (0000) is read out first, word 8 (1000) is read out second, etc.

FIG. 2 shows how two 4096 word memories can be used to implement a "double bucket" scrambler and buffer. While one memory collects input data in a naturally ordered manner, the other memory is addressed in a scrambled fashion and feeds an FFT processor. All switches change state after 4096 words of new data are collected and a scrambled sequence is fed to the processor. While the "double bucket" approach to scrambling is probably the easiest to understand, it is quite expensive and inefficient, since twice as many memory locations are needed as are necessary.

Redundancy Buffers

Before investigating more economical scrambling schemes we shall define what is meant by a redundant scrambler operation or record overlapping. The term "redundancy" will be designated by the symbol *R* and defined as the ratio $T/\tau$, i.e., $R = T/\tau$ where $T$ = record length in sec and $\tau$ = overlap time in sec.

In effect, then, record redundancy relates in the present context to the technique of generating an output sequence comprising a complete set of N Fourier coefficients (corresponding to a sequence of N input samples) during each interval of time $T/R$. Because of the higher rate of generation of output signals, it is clear that each input sample will contribute to R output sequences. Viewed alternately, the output data rate must exceed the input data rate by a factor of R. This higher output rate is, of course, required because it is desired to generate complete (non-overlapped) output sequences corresponding to overlapped selections from an input sequence.

In FIG. 3 a number of "windows" of duration T seconds are shown. Time is the horizontal axis in each case. If the data samples occurring in each window of $T$ seconds are processed by FFT techniques in a period of duration less than or equal to $\tau$ seconds, it is possible for the samples in the immediately following window to be processed without delay. That is, the FFT processing may proceed in real time with redundancy $R = T/\tau$.

FIG. 4 illustrates a first memory organization technique and associated retrieval pattern for a 4096 sample record with a redundancy of four. The memory for the redundancy buffer arrangement shown in FIG. 4 includes a 5120 word memory divided at any time into two portions. Initially, a first 4096-word portion (locations 0-4095) stores the record corresponding to the immediately preceding $T$-second interval. A first $\tau$-second duration readout spans this portion of memory as indicated under record number 1 in FIG. 4. The contents of the remaining 1024 words are updated during this $\tau$-second interval by newly arrived data.

A second $\tau$-second duration readout then occurs which spans the 4096 portion including locations 1024 through 5119. Meanwhile locations 0 through 1023 are updated. This process is illustrated under record number 2 in FIG. 4. The successive shifting of the portion to be accessed for readout in increments of 1024 locations proceeds through record number 5. After that, the process is repeated, with record number 6 spanning the same portion of memory as record number 1. The contents of the memory for any readout will, of course, depend on the results of the partial updating occurring during the preceding four $\tau$-second time intervals.

It is noted that in general (for any R such that 4096/R is an integer), an extra 4096/R words of memory are required for a 4096-sample record. Since most memories are arranged in modules having a an integer power of 2 locations to optimize addressing efficiency, it is clear that the arrangement illustrated in FIG. 4 requires a nonstandard memory size or more than one memory. Further, complexity and inefficiency of accessing circuitry occurs in connection with a redundancy buffer of the type shown in FIG. 4.

Improved Redundancy Buffer

An improved redundancy buffer system in accordance with one embodiment of the present invention will now be disclosed. This system represents an improvement over the arrangement shown in FIG. 4 in that, inter alia, only 4096 memory locations need be provided for a record having 4096 samples.

If a single 4096 word memory is to be used for a data scrambler incorporating redundancy, some means for replacing old, never to be used again, information with new input data must be provided. It is not possible to merely replace the oldest data with new information, since the FFT processor, in accepting the data in scrambled form, requires that some of the newest data be fed to it before some of the oldest data. In other words, if the oldest data were replaced as soon as new data arrives, it would not be available for subsequent insertion in the FFT processor near the end of a scrambled 4096 word frame. It is necessary that only data that has been sent to the processor for the last time be replaced.

A simplified example involving the scrambling of a 16-sample record will be treated first. Again, a redundancy of four will be assumed. Thus, the inventive apparatus organization and method will be illustrated for the transformation represented by FIGS. 1A and 1B.

FIG. 5 is a plot of address numbers (ordinate) against time (abscissa) for the unscrambled process (at the left) and the prescrambled process (at the right) for the 16-sample record of FIGS. 1A and 1B. The individual address-specifying points are connected in groups of four to aid in understanding the operation of the illustrative embodiment of the present invention with a redundancy of four.

There are two important things to note about the scrambled address pattern. First, the pattern is such that every fourth address identifies a location in the upper fourth of the memory. In general, for a sequence of $2^m$ addresses and a redundancy of $R$, every $r^{th}$ address will be associated with the upper $2^m/R$ locations in the memory as long as $R$ is an integer power of 2. For instance, every $8^{th}$ address identifies a location in the upper eighth of the memory.

A second noteworthy characteristic of the address pattern in FIG. 5 is that the set of locations identified with every fourth point (connected by dashed lines) form a pattern which is similar to the pattern generated by the first four points connected by solid lines. The two patterns are similar in that the points connected by dotted lines occupy the same relative positions within the upper quadrant as the points connected by each of the sets of solid lines occupy within the entire memory. While the addresses corresponding to any one of the solid line patterns are generated by reversing all four bits in four consecutive addresses in the unscrambled address sequence, the dotted line pattern is generated by holding the two most significant bits fixed and reversing all remaining bits. FIG. 6 illustrates the corresponding bit patterns for the four sets of dotted line-connected points in positions (top to bottom) corresponding to the respective dotted lines in FIG. 5. The addresses connected by dotted lines in FIG. 5 will be referred to as "scrambled within a quadrant" addresses.

It should be clear from the above how this rule can be applied to a $2^{12} = 4096$-point sequence. To go from the unscrambled domain to the "scrambled within a quadrant" domain, only the 10 least significant bits (out of a total of 12) require a bit reversal.

The manner of incorporating redundancy (record overlapping) into the scrambling process will now be considered As was mentioned above, if a system with a redundancy of four is desired, the word readout rate for the memory must be at least four times higher than the input word rate. This constraint implies that a memory location must be made available to store a new input word once every four output clock intervals. Since the chosen redundancy ($R$=4) is an integer of 2, the above scrambling process in which every fourth address defines a location in the upper memory quadrant is applicable.

Basically, the memory reading and writing are interleaved in a manner suggested by the recognition of the symmetries noted above, i.e., the scrambled within quadrant characteristics. In particular, it occurs that a particular quadrant of memory is never required to be accessed for readout more than once for every four readouts from memory as a whole. Thus, any modifications (updating) made to a quadrant of data immediately after reading a given word from that quadrant will not affect the complete (4-quadrant) sequence actually read from memory during the four memory readout accesses including that for the given word and those for the succeeding three words read from memory.

To be more specific, it is clear that in the case where $N = 16$, for example, a word in the memory location corresponding to the first word in the first quadrant may be updated while data signals for the remaining quadrants are accessed for readout. Similarly, the first readout location in the second readout sequence falling within the second quadrant will be modified while the first, third and fourth quadrants are being accessed. For the case where $R = 4$ (with the attendant requirement that the readout rate be four times greater than the readin rate) it is clear that the updating may be performed in this general manner in real time.

Figure 7B:
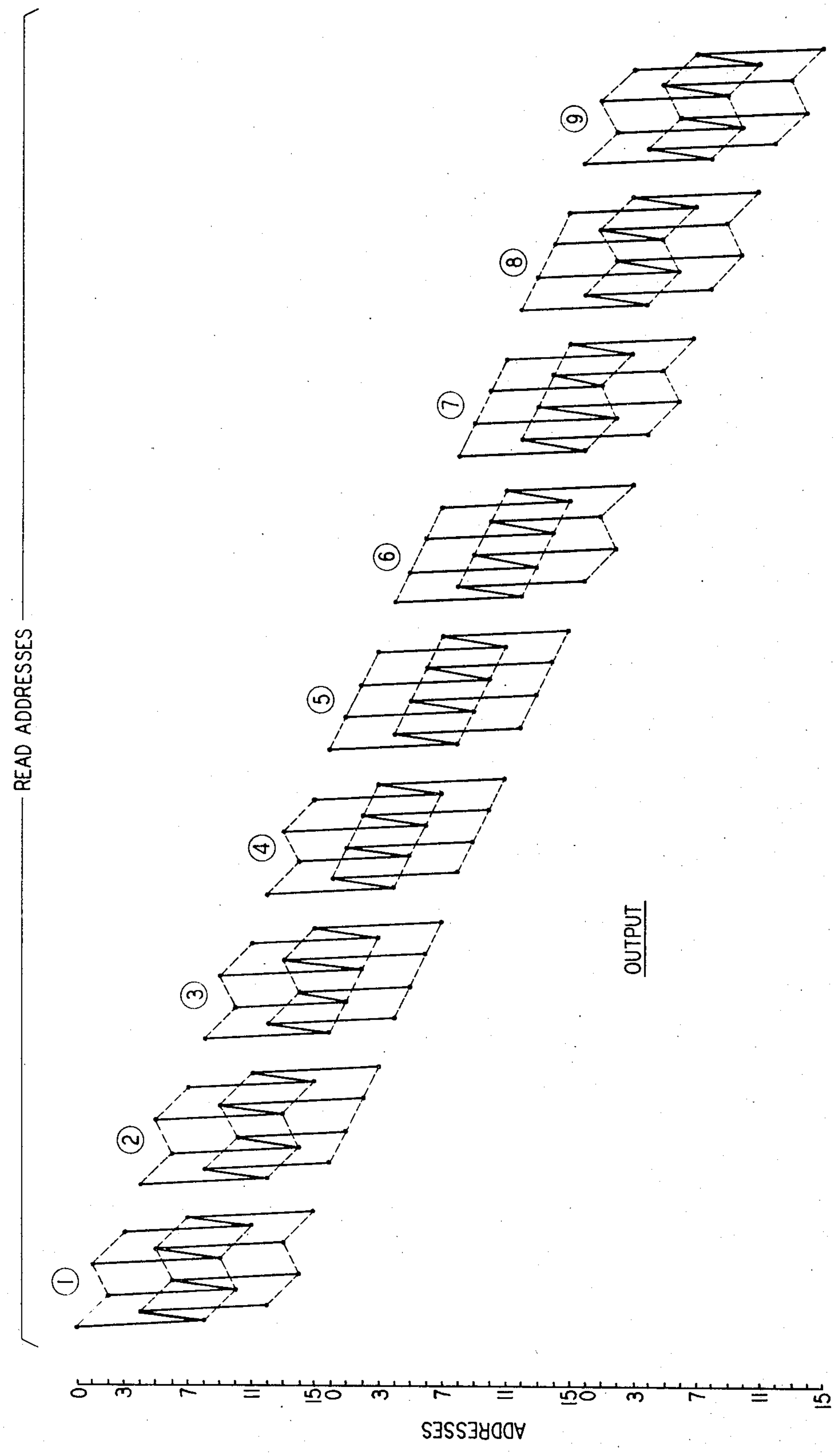
FIG. 7B shows the pattern of readout addresses associated with the write-in pattern of FIG. 7 for a redundancy of four.

FIGS. 7A and 7B illustrate the generalized practice for successive time intervals. The ordinate in each case is the memory address location. Similarly, FIGS. 7A and 7B have time as the abscissa. FIG. 7A shows the sequence of memory locations which are addressed for purposes of writing (updating) as a function of time. Correspondingly, FIG. 7B shows the pattern of addresses for readout. Note that the first pattern of input addresses and corresponding output addresses are identical to those shown in FIG. 5. If it is assumed that the 16-word memory is cleared before starting the processes illustrated in FIGS. 7A and 7B, then the first readout sequence (FIG. 7B) commences immediately after the memory is written into in accordance with the first 16-element write-in sequence (FIG. 7A). Thus if a time reference on the horizontal axis in FIG. 7B is established at the beginning of the first readout sequence, the corresponding point in FIG. 7A occurs at the beginning of the second write-in cycle.

The respective second sequences of input and output addresses are seen to be different, however. In particular, the second input sequence is seen to be scrambled within each quadrant, since the appropriate memory locations which require updating become available in a scrambled manner. It is noted that the pattern of the second output sequence shown in FIG. 7B is identical to the first output sequence shown in FIG. 7B, except for the four points in the lowest (here the first quadrant, locations 0–3). These latter four points produce an effective scrambled output when read out in an unscrambled (straight sequential manner shown, i.e., not scrambled within a quadrant) address sequence because this quadrant of the memory was loaded in a scrambled fashion.

Successive output sequences shown in FIG. 7B include progressively smaller degrees of scrambling within quadrants until the fifth sequence which is seen to be unscrambled for all four quadrants. The readout of the fifth output sequence in the unscrambled fashion shown permits the top quadrant of the memory to be again loaded in an unscrambled fashion. As before, the output sequences then become partially scrambled and partially unscrambled through the eighth output sequence. The ninth output sequence is (like the first output sequence) fully scrambled. The entire readin and readout process is then repeated.

To summarize the 16-point scrambling example given above, then, it is noted that 1. For the case $R = 4$ the readout rate is four times greater than the readin rate.
2. The entire readin-readout process is cyclical with a period equal in duration to $2N = 32$ input time periods.
3. Alternate 16-point input sequences are straight sequential and scrambled within quadrants.
4. During each 16-point readout sequence only one of the (4-word) quadrants of memory is updated.

Hardware Organization

Figure 8:
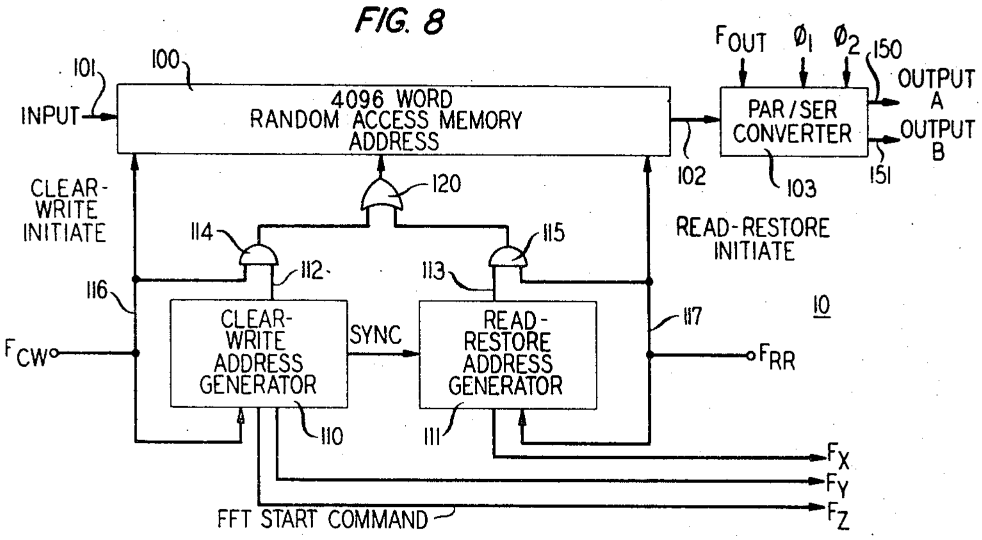
FIG. 8 is a block diagram representation of a system illustrating one embodiment of the instant invention.

FIG. 8 shows the overall organization of a data scrambling system in accordance with an illustrative embodiment of the instant invention. For purposes of illustration, a value of $N = 4096$ will be chosen. As mentioned above, the instant scrambling techniques permit the use of only a 4096-word buffer memory in accomplishing this purpose. Thus, FIG. 8 shows a memory 100 arranged to receive input data signals on lead 101. The output from memory is arranged to appear on leads 102.

As indicated in FIG. 8, memory 100 is advantageously chosen to be a random access word-organized memory. Accordingly, each output word is delivered on leads 102 as an $n$-bit word. The value for $n$ will, of course, be chosen to be compatible with the FFT or other processing apparatus to which the output is connected. Additionally, the value for $n$ is chosen to be sufficient to represent the input samples with the desired degree of accuracy. Since the FFT processor configuration commonly encountered is a serially organized machine (see, for example, U.S. Pat. application Ser. No. 82,572 filed Oct. 21, 1970), it is often required that some parallel-to-serial transformation be performed with respect to the (parallel) output data words from memory 100. Accordingly, parallel-to-serial converter 103 is advantageously connected to output leads 102. Parallel-to-serial conversion may be accomplished in a straightforward manner familiar to those skilled in the art. A particular arrangement found to be convenient for present purposes will be described below. Additionally, more will be said about the control signals for performing timing and control operations below.

The heart of a scrambling system in accordance with the techniques illustrated above is, of course, the memory accessing circuitry. In the system shown in FIG. 8 there are provided two address generators 110 and 111. These control the write and read operations, respectively. The outputs from address generators 110 and 111 are delivered over leads 112 and 113 to respective AND-gates 114 and 115. A second input to each of the AND-gates 114 and 115 is arranged to receive a corresponding control signal. Thus AND-gate 114 receives the signal designated $F_{CW}$ (clear-write) on lead 116 while AND-gate 115 receives an $F_{RR}$ (read-restore) signal on lead 117. The address appearing at the output of either of AND-gates 114 or 115 is then delivered to memory 100 by way of OR-gate 120. Again, the details of the signals appearing on control leads indicated in FIG. 8 will be specified in greater detail below.

Figure 9:
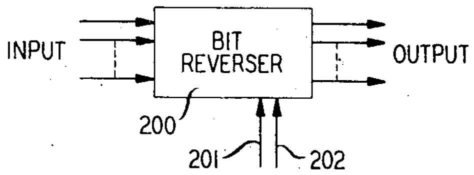
FIG. 9 illustrates the basic bit-reversal operation embodied in the instant invention.
Figure 10:
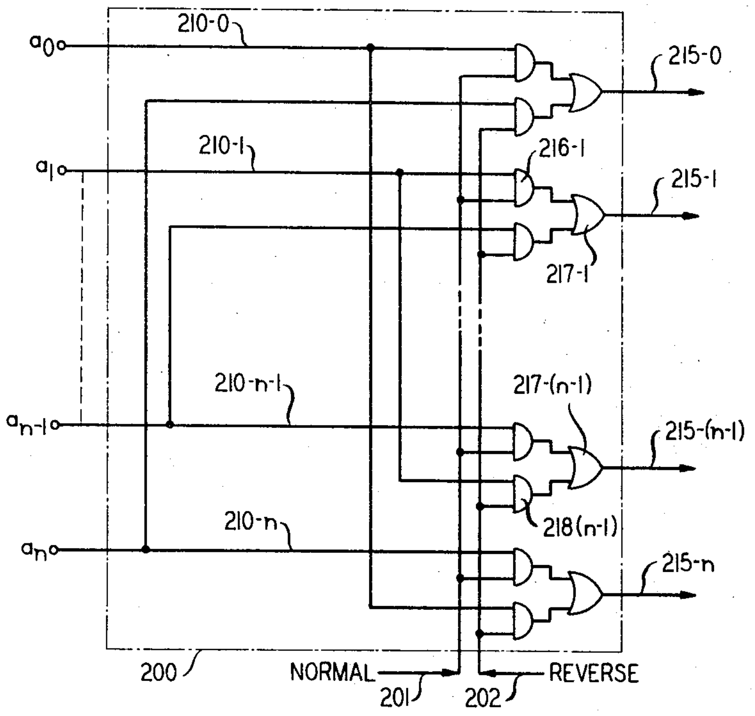
FIG. 10 shows a circuit for performing the bit reversal function illustrated in FIG. 9 in accordance with an illustrative embodiment of the instant invention.

A basic operation performed in each of the address generators 110 and 111 is that of bit reversal of an address sequence. FIG. 9 illustrates this basic operation. Thus a pattern of input address bits is supplied at the input of a bit reverser circuit 200. Depending upon which of two control leads 201 or 202 is activated, the bit pattern appearing at the output of bit reverser 200 is identical to, or the bits-reversed representation of, the input bit pattern. FIG. 10 shows a typical circuit configuration for performing the required bit reversing operations on a given input bit pattern.

In particular, FIG. 10 illustrates an interconnecting network for causing input leads 210-0 through 210-*n* to be connected to corresponding output leads 215-0 through 215-*n*. Again, control leads 201 and 202 are provided to gate the appropriate representations appearing on leads 210-*i* to corresponding output leads 215-*j*. For example, when no bit reversal is required, a gating signal appears on lead 201 which permits the signal appearing on lead 210-1 to proceed by way of AND-gate 216-1 and OR-gate 217-1 to output lead 215-1. Conversely, when a bit reversal is required, a gating signal appearing on lead 202 causes the signal appearing on lead 210-1 to be gated by way of AND-gate 218-($n-1$) and OR-gate 217-($n-1$) to output lead 215-($n-1$). Similar straightforward selection is performed with respect to bit signals appearing on the other input leads 210-*i*.

The output from bit reverser 200 shown in FIGS. 9 and 10, reading from top to bottom on the output leads, is, then, an address with digits appearing in the order $a_0, a_1, \ldots, a_n$ when the "normal" control lead 201 is activated and in the order $a_n, a_{n-1}, \ldots, a_0$ when the "reverse" control lead 202 is activated. In each case, again reading from top to bottom, the input sequence is $a_0, a_1, \ldots, a_n$.

Figure 11:
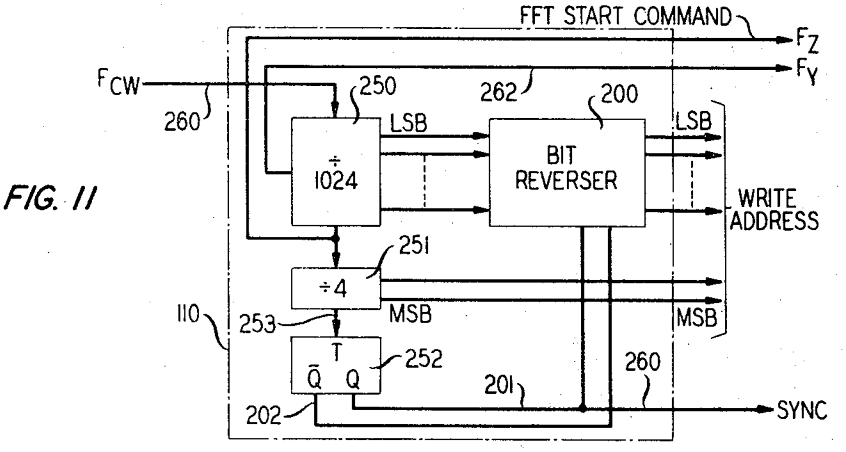
FIG. 11 illustrates a typical embodiment of the clear-write address generator for the circuit of FIG. 8.

FIG. 11 shows in more detail the clear-write address generator 110 shown in FIG. 8. As indicated above, a bit reverser 200 of the type illustrated, for example, in FIG. 10 supplies on its output a bit pattern of write addresses. The input to bit reverser 200 is a $2^{10}=1024$ state binary counter 250, which is of standard design. Thus it is seen that the input to bit reverser 200 is a 10-bit address pattern. These 10 bits correspond to the 10 least significant bits of the write address. Also shown in FIG. 11 is a four-state counter 251. The output from counter 251 is used directly to supply the additional 2 (highest order) bits required to constitute a 12-bit address.

It will be assumed for initial purposes that the bit reverser has the "normal" control lead 201 activated so that the 10-bit address pattern is propagated through bit reverser 200 unaltered. Since the operation of bit reverser 200 requires that it provide bit reversal and nonreversal for alternate sequences of 4096 samples, it is convenient to generate the normal and reverse control leads by using a standard toggle flip-flop indicated by 252 in FIG. 11. Thus, after each time counter 251 is cycled from its maximum state to its minimum state (state 11 to state 00) an output signal is generated on lead 253 to the toggle input of a standard toggle flip-flop 252. The outputs from flip-flop 252 are then the required control leads 201 and 202.

A clock signal designated $F_{CW}$ appearing on lead 260 is arranged to advance counter 250 sequentially through its 1024 states at a rate equal to the required input sample rate. Counter 251 is arranged to be responsive to a transition from the maximum state (1111111111) to the minimum state (0000000000) of counter 250 to advance through its four states. Effectively, then, the combination of counters 250 and 251 is a composite 12-stage (4096-state) counter. As counters 250 and 251 are advanced under the control of signals appearing on lead 260, a sequential unscrambled address pattern of the type shown at the top of FIG. 7A is generated while bit reverser 200 is in its "-normal" state.

After the complete 4096 address sequence is presented on the output leads of bit reverser 200 and the output leads of counter 251, a new pattern of 4096 addresses is begun. This new sequence, however, is scrambled within each quadrant in the manner shown by the second complete sequence of write addresses indicated in FIG. 7A. After completion of the 4096-point scrambled within quadrant sequence, the flip-flop 252 is again toggled causing control lead 201 to again be activated. As expected, the address pattern generated at the output of bit reverser 200 is then straight sequential (unscrambled) in the manner shown generally in the bottom input address sequence of FIG. 7A.

A sync control lead 260 is derived from the signal on lead 201 indicating that the 0 state of an unscrambled sequence is starting. This signal is used in a manner to be indicated below to insure that the output (read-restore) address generator (111 in FIG. 8) is set to the correct corresponding state. Lead $F_Y$ similarly signals that the write-sequencing within a given quadrant is complete and a new quadrant is about to begin. Since the output rate is four times greater than the input rate, an $F_Y$ signal on lead 262 indicates that a complete new output sequence can begin. More will be said about the manner in which the output reading is responsive to signals on lead 262 in the sequel.

Figure 12:
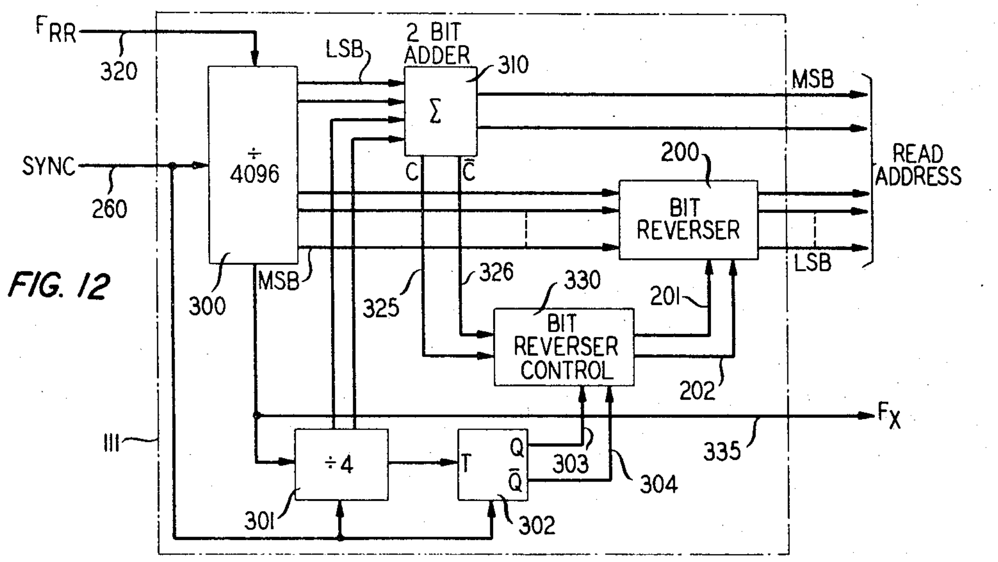
FIG. 12 illustrates a typical embodiment of the read-restore address generator of FIG. 8.

FIG. 12 shows a block diagram of the address generator for controlling the readout from memory 100 in FIG. 8. In particular, FIG. 12 shows in greater detail the read restore address generator 111 shown in FIG. 8. As was the case in the clear-write address generator 110 shown in FIG. 11, there is contained in the circuit of FIG. 12 a bit reverser of the same configuration as is shown in typical embodiment in FIG. 10. This bit reverser is therefore again designated 200.

The remaining elements shown in FIG. 12 will be identified in the course of describing a typical operating sequence for that circuit. It will be assumed that a sync pulse from the input (clear-write) address generator 110 appearing on led 260 has just been initiated, indicating that a new output sequence is to begin. This sync pulse is conveniently arranged to set 12-stage (4096-state) counter 300 to its all-0 state. The pulse appearing on sync lead 260 is also conveniently arranged to set the two-stage (four state) counter 301 to its all-0 state. Additionally, flip-flop 302 is set to the state identified with the reverse condition for control purposes for controlling bit reverser 200. That is, flip-flop 302 is arranged such that a 1 condition appears on the $\bar{Q}$ output lead 304. The Q output 303 is, of course, correspondingly set to the 0 condition. Bit reverser control circuit 330 is initially arranged to pass the reverse condition indication to bit reverser 200 without modification.

Also appearing in the circuit of FIG. 12 is a 2-bit adder 310. The inputs to this adder are the two least significant bits of the 12-stage counter 300 and the 2 bits indicating the state of the two-stage counter 301. When initialized by the pulse on lead 260, therefore, the output from adder 310 is merely the sum of the all-0 bits from the least significant 2 bits of counter 300 added to the two 0 bits of counter 301. In other circumstances, when counter 301 is in the all-0 condition, the output from adder 310 is merely the two least significant bits from counter 300. When counter 301 is not in the 00 condition an actual addition is performed. In any event, the output from 2-bit adder 310 is presented as the two most significant bits of the read address for accessing memory 100. Bit reverser 200 in a complementary fashion passes the 10 most significant bits of counter 300 to supply corresponding address bits for memory 100. These latter 10 bits are the 10 most significant bits of counter 300, but upon passing through bit reverser 200 are presented to memory 100 as the 10 least significant bits of the accessing address.

The first pattern of 4096 addresses generated at the output of bit reverser 200 and adder 310, then, corresponds in kind to the first scrambled output sequence shown in FIG. 7B. The incrementing of counter 300 is in response to clock signals appearing on lead 320. These signals are designated $F_{RR}$ (read-restore) and occur at a rate four-times greater than the $F_{CW}$ clock signals appearing at lead 116 in FIG. 8.

It may be verified by referring to the input address sequence specified in FIG. 1A that the outputs of a 16-state counter of the same type as 4096-state counter 300 in FIG. 12 will, when operated on by a 2-bit adder like 310 and bit reverser like 200 in FIG. 12, generate the address sequence of FIG. 1B. Thus, the two low order bits (00) of the first address in the input sequence appear at the output of adder 310, except that they are treated as the most significant 2 bits. The lowest order bit becomes the highest order bit and the second lowest order bit becomes the second highest order bit. The bit reverser 200 passes the highest order 2 bits (00) in bit-reversed form and in a position such that they appear as the low order 2 bits. The first output address is then 0000.

The next input address (as specified by the output of a four-stage counter like the 12-stage counter 300 in FIG. 12) is 0001. The low order 2 bits (01) are passed to the output as the high order 2 bits in the order 10. Meanwhile, the highest order bits (00) are reversed as they pass through bit reverser 200. The output result is then 1000, exactly the desired output for the second address. The next two input addresses for the 16-address sequence are 0010 and 0011 which appear after processing as 0100 and 1100.

The fifth input address in the 16-address sequence is 0100. The signals representing the two least significant digits 00 are again passed, because of the 00 state of counter 301, unchanged, except for their position on the output leads of adder 310. The highest order 2 bits appear in bit reversed form as 10, thereby causing the total output address to be 0010. This process is repeated for the entire first 16-address sequence supplied by the sequential states of a 16-state binary counter.

Returning to the 4096-address sequence supplied by the counter 300 in FIG. 12, it is clear that an analogous process ensues. Since the lowest order 2 bits of counter 300 assume sequential values of 00, 01, 10, and 11 repetitively, the highest order 2 bits of the output read addresses necessarily sequence through corresponding states. This has the desirable effect of causing any four consecutive read addresses to relate to four different quadrants of memory.

When the first sequence of 4096 addresses is generated by the circuitry of FIG. 12, counter 301 is advanced from state 00 to state 01 as a result of the corresponding transition of counter 300 from state 111111111111 to state 000000000000. The effect of this modification of the state of counter 301 in FIG. 12 is that 010000000000 is added to all addresses generated by bit reverser 200 and counter 300 during its next cycle of operation. This has the effect of shifting the output for the second of two overlapping passes by 1024 output sample periods, i.e., one quadrant. This effect is illustrated in FIG. 7B for the 16-sample record by the vertical displacement of the second readout pattern relative to the first readout pattern.

It is clear that when counter 301 is not in the 00 state an overflow from adder 310 will tend to occur. That is, the sum of the outputs from the low order 2 bits of counter 300 and the output from counter 301 will tend to exceed 11. The physical significance of the overflow relates to the fact that the second cycle of readout addresses begins with an address in the second quadrant. This is achieved because 00 from counter 300 when interpreted as the high order address bits and when added to 01 from counter 301 yields 01 for high order bits of the first effective read address of the second sequence. The following read address is then in the fourth quadrant (10 from counter 300 when reinterpreted, added to 01 from counter 301). Then the third read address is in the third quadrant (01 + 01 = 10). When counter 300 presents 11 as its two lowest order bits the result is 11 + 01 = 100, an overflow.

The circuit of FIG. 12 is, however, arranged to accommodate itself to this contingency. Accordingly, when this overflow occurs a bit reversal within the quadrant is effected to account for the fact that the corresponding input record was entered into memory 100 in scrambled form. This overflow is detected by the carry output 325 (and its complement 326) in FIG. 12. These leads are presented to the additional bit reversing circuit 330.

It should be clear now that bit reverser control circuit 330 may include a flip-flop capable of being set under appropriate circumstances by the $\overline{Q}$ output lead 304 from flip-flop 302 or from the $\overline{C}$ lead 326 (the complement of the carry output from adder 310). Further, the flip-flop in reverser control circuit 330 may be reset by a signal on the C lead 325 or the Q lead 303. When set, the bit reverser control flip-flop 330 causes a 1 signal to appear on the "reversed" lead 202. Conversely, when reset, the flip-flop causes a 1 signal to appear on the "normal" input lead 201 to bit reverser 200. Suitable straightforward safeguards are included in bit reverser control circuit 330 to prevent its being set and reset simultaneously by signals from adder 310 and flip-flop 302. Thus, for example, at the end of each readout sequence, the flip-flop in the bit reverser control circuit 330 is advantageously reset by a pulse signal derived from the input to the toggle input to flip-flop or otherwise. Note that the original input to adder 310 for the first address of a new output address sequence is always 00; thus no overflow can occur at that time. Many equivalent circuit configurations can be used to implement the desired control functions of circuit 330.

The effect of a carry signal upon the generation of the fourth address of the second readout sequence by counter 300 is to restore bit reverser 200 to its normal state. Thus the scrambled within a quadrant pattern associated with the memory addresses during the first readout address sequence described above is modified for each state of counter 300 that results in an overflow of adder 310. This variation can most readily be seen for the case of the first and second readout address sequences shown in FIG. 7B. Note that the lowest (fourth) quadrant in the first sequence is accessed in scrambled fashion while the lowest (first) quadrant in the second sequence is accessed in unscrambled order.

The third and fourth readout sequences have associated with them respective states of 10 and 11 for counter 301 in FIG. 12. Thus overflows from adder 310 occur with greater regularity, resulting in a greater frequency of the normal condition for bit reverser 200. This is reflected for the 16-address case in FIG. 7B by a reduction in scrambling within quadrant sequencing.

After four output sequences have been read from memory 100 in the general manner indicated in FIG. 7B and described in detail above, the four state counter 301 in FIG. 12 returns to the 00 state and changes the state of flip-flop 302 in turn to cause a 1 to appear on the Q lead 303. The change of state of flip-flop 302 activates the normal state of the bit reverser 200. This has the effect that the fifth output sequence (in the sense of FIG. 7B) contains addresses which are unscrambled within a quadrant. When the immediately following sequences involving an overflow of adder 310 are generated, the output address sequence is caused to revert increasingly back to the scrambled state. Finally, after eight sequences of the general form shown in FIG. 7B are generated, flip-flop 302 changes state again and the entire process repeats. Control signal $F_X$ appearing on lead 335 indicates that a 4096 output address sequence has been completed.

Control Clocking

The discussion above relating to the apparatus shown in FIGS. 8-12 have related principally to the manner in which input and output addresses are generated. There are, however, other constraints relating to the input-output process which bear further discussion. These relate principally to the clock control signals required to actually increment the various counters and gate the input and output words to and from memory.

Figure 13:
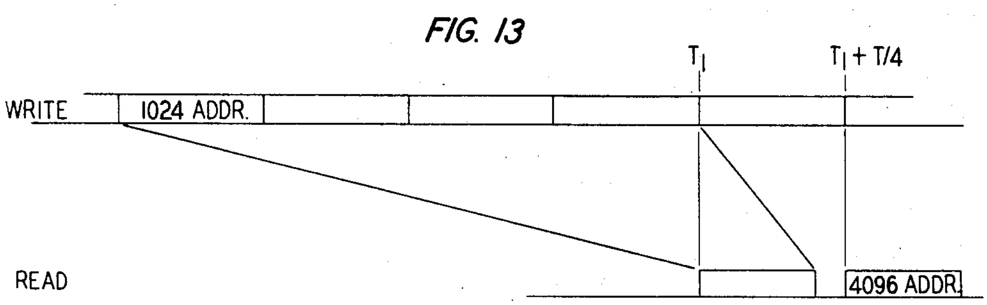
FIG. 13 summarizes the timing relationship between input and output address sequences.

FIG. 13 illustrates a typical relationship between the input and output rates for a 4096 word data record. The upper sequence of blocks represents consecutive sets of 1024 write addresses while the lower sequence represents the associated read address sequence. That is the data written into memory in connection with the leftmost four 1024-write-address sequences at the top is read out during the period associated with the fifth write address sequence. Thus there develops a "telescoping" of data existing in memory at a reference time $T_1$ for purposes of readout during the following T/4 second interval, where, as before, T is the period for a (4096 sample) input record. In practice it proves convenient to read out the entire 4096-point record accumulated during the preceding T-second period in something less than T/4 as shown in FIG. 13.

Figure 14:
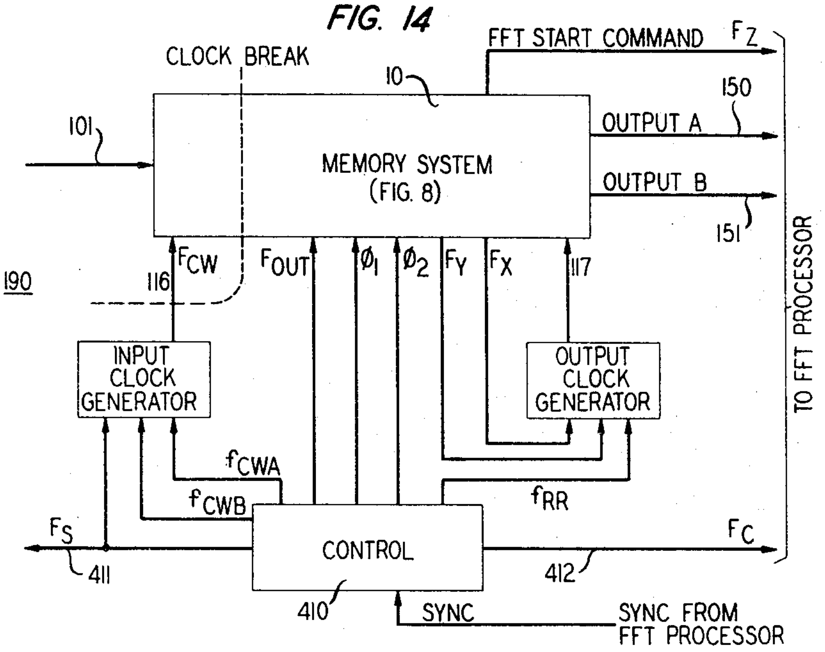
FIG. 14 shows the circuit of FIG. 8 and various of the timing and control circuits associated therewith.

FIG. 14 shows the manner of integrating the circuit shown in FIG. 8 into an overall buffer system 190 and emphasizing the control signals and the manner of application of these signals. Again memory 100 is shown receiving an input sequence on lead 400 and corresponding outputs, designated output A and output B, on leads 401 and 402 respectively. Control circuit 410 is a sequential logic circuit of standard design tailored to generate the requisite timing pulse sequencing. In particular, there is generated in control circuit 410 a clock pulse sequence having a rate equal to the desired input word frequency. This signal appears on lead 411 and is designated $F_S$. Similarly, lead 412 is arranged to carry a clock signal $F_C$ having a rate equal to the desired bit output frequency (since outputs A and B are typically in bit serial form). Other clock signals generated by control circuit 410 and appearing on labeled leads in FIG. 14 are represented with corresponding labels in FIG. 15.

Since the required redundancy has been chosen to be four, with the attendant requirements that one word (or less) of information be written into memory 100 for every four words read out from memory, it is convenient to design a "memory cycle" to include four read-restore subcycles and one clear-write subcycle.

Figure 15:
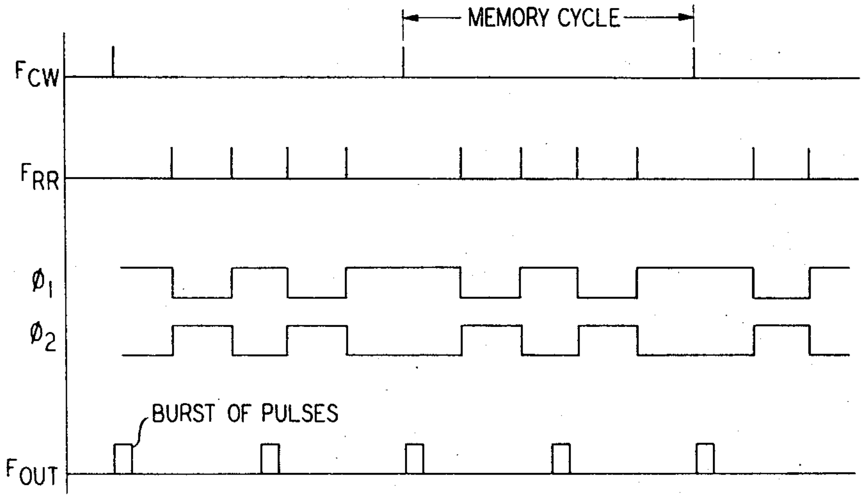
FIG. 15 shows the timing relationship for various of the signals appearing in FIG. 14.

As was mentioned in connection with the description of FIG. 8, $F_{CW}$ is seen to initiate the clear-write subcycle while $F_{RR}$ initiates the read-restore subcycle. $\Phi_1$, $\Phi_2$ and $F_{OUT}$ in FIG. 15 are signals used to control the output serial-to-parallel converter to be described below.

As mentioned above, the clock requirements detailed above require that the input data be received at a rate less than one-quarter the rate for the output words. Accordingly, each input sample requires a limited amount of buffering to insure that it is properly entered into a $F_{CW}$ clock interval. A convenient manner for achieving this buffering is to use an input clock circuit like that shown in FIG. 16. This circuit is operative in response to clock signals designated $f_{CWA}$ and $f_{CWB}$ which are derived from $F_{CW}$. Both are designed to have the same repetition rate as $F_{CW}$, but $f_{CWB}$ is delayed with respect to $f_{CWA}$.

Figure 16:
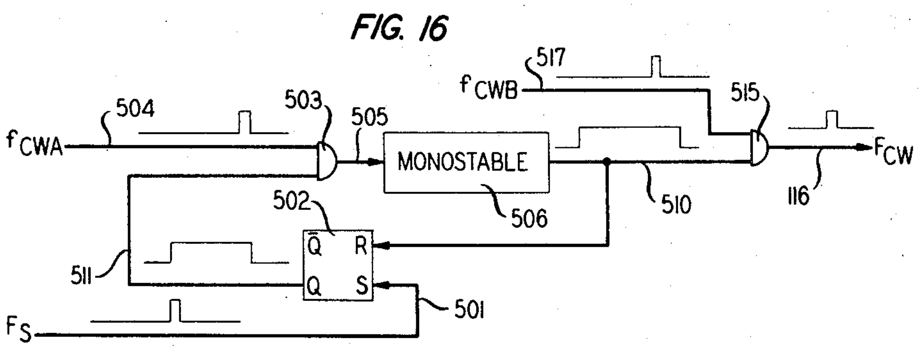
FIG. 16 illustrates a typical input clock generator circuit for use in connection with the circuit of FIGS. 8 and 14.

In operation, then, the circuit of FIG. 16 receives an $F_S$ pulse on lead 501 indicating that an input word is to be presented to memory 100 in the configuration shown in FIG. 8. This input sample pulse $F_S$ on lead 501 sets flip-flop 502 to its true state. The true output Q of flip-flop 502 is connected to one output of AND-gate 503. When an $f_{CWA}$ pulse is presented on lead 504, an output on lead 505 from AND-gate 503 activates a monostable multivibrator circuit 506. The output from monostable circuit 506 is indicated in FIG. 16 over the lead 510. An effect of the pulse output from monostable circuit 506 is to reset flip-flop 502 to its false or 0 state. This terminates the pulse output on lead 511 as shown in FIG. 16. Another effect of the pulse appearing on lead 510 is to cause AND-gate 515 to produce an output on lead 116 in FIGS. 8 and 16 whenever an $f_{CWB}$ pulse appears on lead 517. The effect of the circuit in FIG. 16, then, is to permit the first $f_{CWB}$ pulse on lead 517 following the presentation of an input word to permit an $F_{CW}$ pulse to gate the presented word to memory 100.

Figure 17:
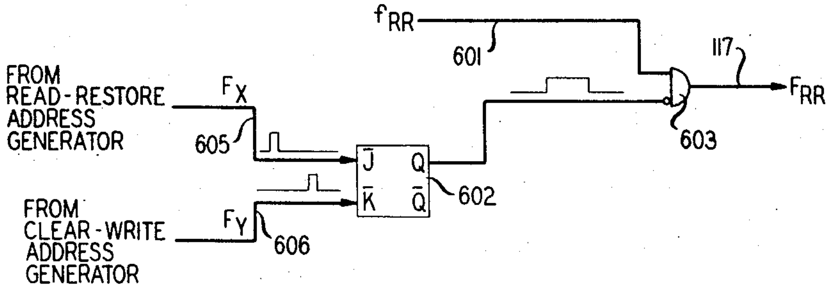
FIG. 17 illustrates a typical output clock generator circuit for use in connection with the circuit of FIGS. 8 and 14.

FIG. 17 shows a circuit representation of an output clock generator corresponding to the input clock generator shown in FIG. 16. The effect of the circuit shown in FIG. 17 is to cause the $f_{RR}$ clock signal appearing on lead 601 to be gated by a signal appearing on the true output of flip-flop 602. The gate circuit used for this purpose is indicated in FIG. 17 by the designation 603. Note that the input of gate 603 connected to the flip-flop 602 is an inhibit input. $F_X$ signals appearing on lead 605 indicate the completion of a 4096 word output sequence. The presence of this signal is arranged to gate $f_{RR}$ signals off. Conversely, when an $F_Y$ signal (indicating the beginning of a new input quadrant) appears on lead 606, flip-flop 602 is reset, thus permitting $F_{RR}$ clock signals to appear on lead 117 as shown in FIGS. 8 and 17.

Parallel-to-Serial Conversion

Figure 18:
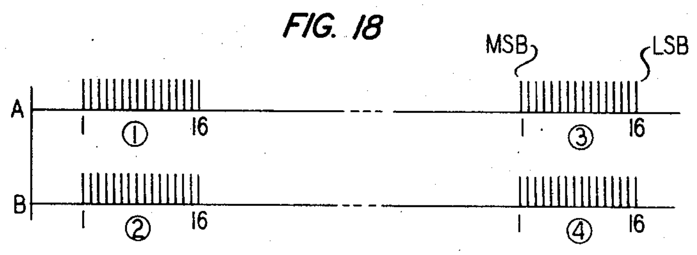
FIG. 18 illustrates a typical timing relationship for words (bit patterns) required by an FFT processor to be served by the buffer-scrambler of FIG. 8.

As was noted in connection with the discussion of FIG. 8 above, many FFT processors and other apparatus require a serial input. For efficiency of storage and to effect the desired scrambling as indicated above, the buffer organization is typically a word-organized (parallel) one. It is clear, therefore, that a parallel-to-serial converter is required in the manner shown in FIG. 8 by the block 103. A typical desired format for bit patterns to be presented on leads 150 and 151 in FIG. 8 is shown in FIG. 18. Thus sequences of 16-bits are seen to be presented on outputs A and B.

Figure 19:
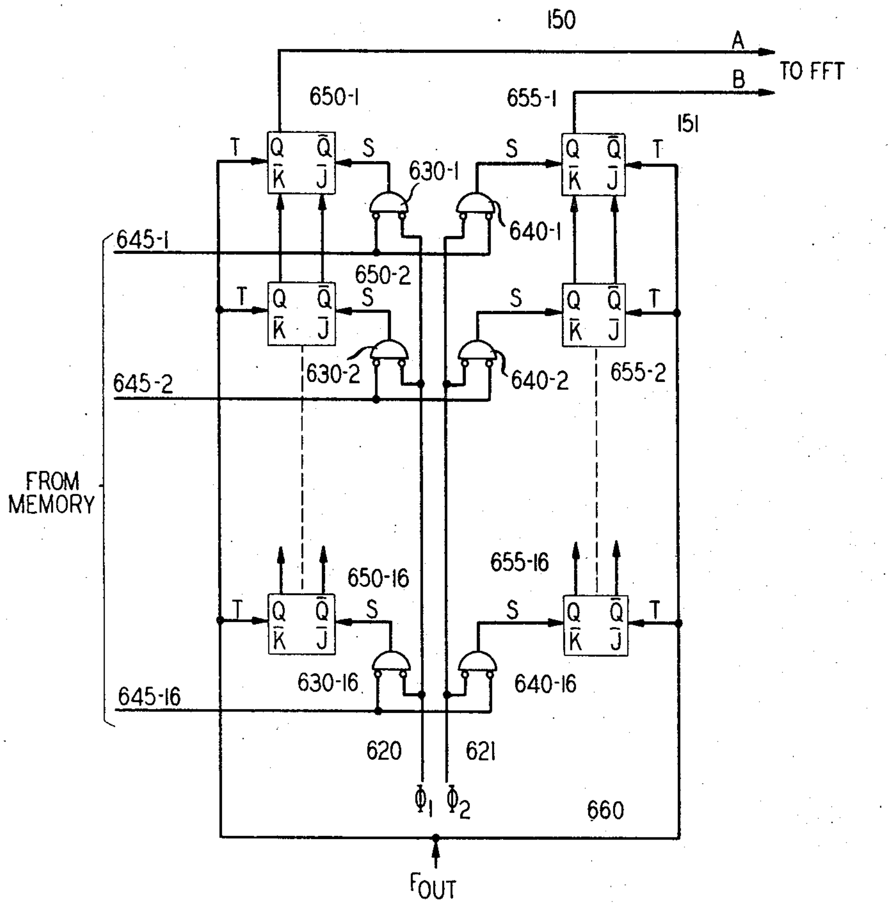
FIG. 19 is a schematic representation of a parallel-to-serial converter used to interface the buffer-scrambler of FIG. 8 to a typical FFT processor.

A circuit for performing the actual parallel-to-serial conversion in the manner shown in FIGS. 8 and 18 is shown in FIG. 19. Clock signals $\Phi_1$ and $\Phi_2$ appearing on leads identified in FIG. 19 by the designations 620 and 621 are supplied to respective NAND-gates 630-*i* and 640-*i*, $i = 1,2, \ldots ,16$. The other input to each respective pair of NAND-gates 630-*i* and 640-*i* appears on leads 645-*i*, $i = 1,2, \ldots ,16$. The outputs of the bank of gates 630-*i* and 640-*i* are conveniently arranged to be entered into corresponding banks of JK flip-flops 650-*i* and 655-*i*, $i = 1,2, \ldots ,16$. As indicated in FIG. 15, the clock signal $F_{OUT}$ appearing on lead 660 in FIG. 19 is a sequence of bursts of pulses. For the case of 16-bit memory words, these bursts are arranged to comprise 32 pulses.

The effect, then, of reading two successive words from memory 100 in FIG. 8 over leads 102 is to cause alternate gate banks 630-*i* and 640-*i* to be activated, thereby causing alternate parallel words to be read into JK flip-flop banks 650-*i* and 655-*i*, respectively. Finally, the associated burst of $F_{OUT}$ clock signals appearing on lead 660 causes a serial sequence of 16 bits to appear simultaneously on each of leads 150 and 151. The reason that 32 bits are included in each $F_{OUT}$ clock pulse sequence is that not only are the 16 bits stored in the respective flip-flop banks propagated from stage to stage (from stage 16 toward stage 1 in each case), but also that each of these register stages will then be set to 0. This latter setting to 0 occurs, of course, by virtue of the fact that there are no 1 signals to be shifted into stage 16 of the respective JK flip-flop banks.

An additional benefit of operating the parallel-to-serial converter shown in FIG. 19 in accordance with the clocking information described above and shown in FIG. 15 is that although the input words appearing on leads 645-*i* occur in bursts of four (with spaces in between), the A and B output signals appearing on leads 150 and 151 respectively occur evenly spaced in time. Accordingly, the converter circuitry shown in FIG. 19 also serves to provide a desirable time buffering.

Interface Requirements

Figure 20A:
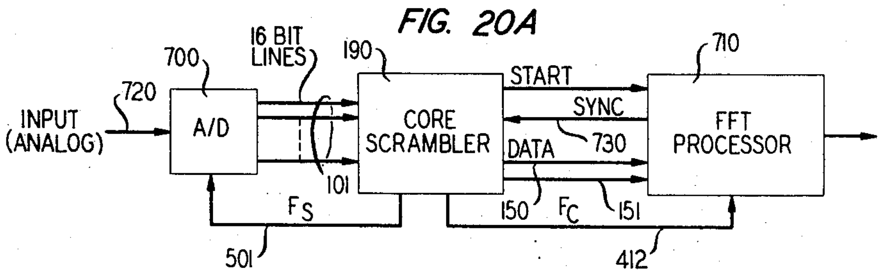
FIG. 20A illustrates the manner of interconnecting the buffer-scrambler of FIGS. 8 and 14 into an overall FFT processing system.
Figure 20B:
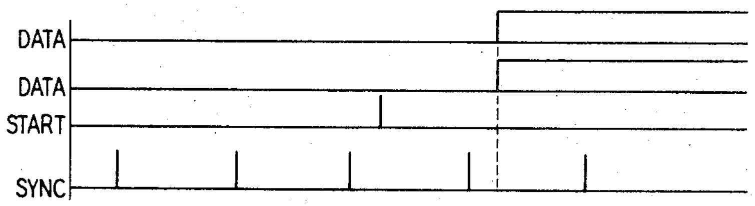
FIG. 20B illustrates various timing relationships for the system of FIG. 20A.

FIGS. 20A and 20B illustrate the manner in which a data scrambler in accordance with the present invention may be incorporated in a fast Fourier analysis system of the type described, for example, in U. S. Pat. application Ser. No. 82,572 cited above. In particular, scrambler buffer 190 shown in FIG. 14 is arranged intermediate an analog-to-digital converter 700 and an FFT processor 710. The analog-to-digital converter 700, in turn, is arranged to generate parallel 16-bit words in response to analog samples received in sequence on input lead 720. Timing information characterizing the interface between scrambler 190 and FFT processor 710 is shown in FIG. 20B.

As is shown in FIG. 20B, a start pulse is sent to FFT processor 710 before the serial data begins. $F_C$ clock signals appearing on clock lead 725 are also supplied. FFT processor 710 in turn sends a sync pulse on lead 730 in standard fashion to insure that data are delivered to processor 710 at the correct time relative to the FFT processor cycle.

Figure 21:
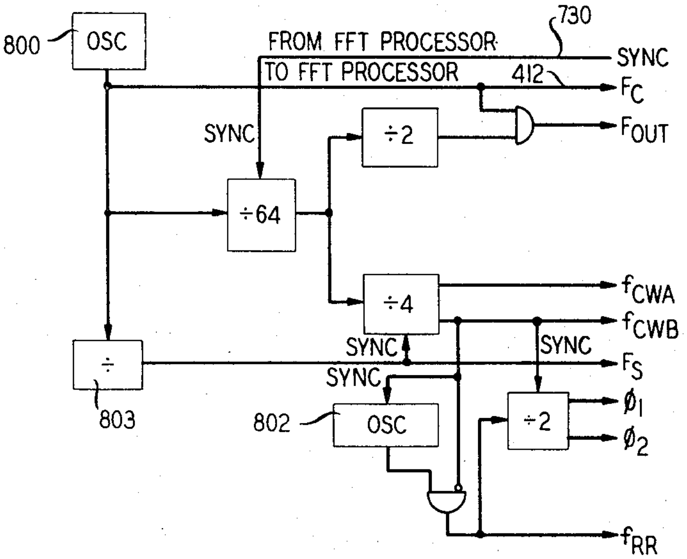
FIG. 21 shows circuitry for generating various of the clock signals required for a typical embodiment of the present invention.

Various timing signals including those not discussed explicitly above are derived as indicated above from a basic source of clock signals in the manner shown in FIG. 21. There, oscillator 800 generates a basic timing sequence which is then divided using standard counter circuits in the manner shown in FIG. 21.

Divide (counter) circuit 803 is arranged to derive clock signals having a repetition rate equal to the desired input word rate. The basic clock signals are, however, provided on lead 725 in FIG. 20A directly to the FFT processor. Clock circuit 802 in FIG. 21 is arranged to generate signals at the desired readout word rate.

Although the above description has included particular recitations of typical word lengths and operating speeds no such limitations are in any way fundamental to the basic operation of the instant invention. Similarly the indicated level of redundancy is in no way to be considered a limitation on the scope of the present invention. While the data buffering and scrambling operations, methods and apparatus described above have particular importance in the FFT processing arts, other applications will occur to those skilled in the arts. Similarly, numerous variations and modifications of the system elements shown in the various figures and described with particularity above will occur to those skilled in the art.

What is claimed is:

1. Apparatus for buffering and digits-reversed scrambling an input sequence of ordered signals to generate sets of N output signals comprising A. a memory having N storage locations, B input addressing means for generating alternate patterns of straight sequential address input signals and scrambled-within-quadrant address input signals, C output addressing means for generating patterns of signals representing output addresses having digits of greatest significance varying for each set of R consecutive addresses, where R is an integer factor of N, D means responsive to said input address signals for causing said input sequence of ordered signals to be stored at corresponding locations in said memory, and E means responsive to said output address signals for reading out signals stored in said memory, thereby deriving said output signals.

2. Apparatus according to claim 1 wherein said input addressing means comprises 1. a first source of clock signals,
2. a modulo-N/R counter for generating a plurality of first count signals representative of a count of said first clock signals, R and N/R being positive integers,
3. a modulo-R counter for generating a set of first address signals representative of the number of transitions of said modulo-N/R counter from its maximum count to its minimum count, and
4. means responsive to said first address signals for selectively reversing the significance of selected ones of said first count signals, thereby to generate second address signals.

3. Apparatus according to claim 2 wherein R represents the redundancy for said sets of N output signals and wherein said first source of clock signals comprises means for generating clock signals at the rate of N/R per second.

4. Apparatus according to claim 1 wherein said output addressing means comprises 1. a source of second clock signals,
2. a modulo-N counter for generating a plurality of second count signals representative of a count of said second clock signals,
3. a modulo-R counter for generating first output address signals representative of the number of transitions of said modulo-N counter from its maximum count to its minimum count, and
4. means responsive to said first output address signals for selectively reversing the significance of selected ones of said second count signals, thereby to generate second output address signals.

5. Apparatus for generating a sequence of input addresses for a memory having N locations comprising A. a source of clock signals, B. a modulo-N/R counter for generating first count signals representative of a count of said clock signals, R and N/R being positive integers, C. a modulo-R counter for generating first address signals representative of the number of transitions of said modulo-N/R counter from maximum count to minimum count, R and N/R being positive integers, and D. means responsive to said first address signals for selectively reversing the significance of selected ones of said first count signals, thereby to generate second address signals.

6. Apparatus according to claim 5 wherein each of said counters is a binary counter and said means responsive to said first address signals comprises means for reversing the significance of the bits of said modulo-N/R counter.

7. Apparatus for generating a sequence of output address signals for a memory having N locations comprising 1. a source of second clock signals,
2. a modulo-N counter for generating a plurality of second count signals representative of a count of said second clock signals,
3. a modulo-R counter for generating first output address signals representative of the number of transitions of said modulo-N counter from its maximum count to its minimum count, and
4. means responsive to said first output address signals for selectively reversing the significance of selected ones of said second count signals, thereby to generate second output address signals.

8. Apparatus according to claim 7 wherein each of said counters is a binary counter, and said means responsive to said first output address signals comprises a control means for selectively reversing the significance of the signals representing the $\log_2(N/R)$ most significant bits of said modulo-N counter.

9. Apparatus according to claim 8 wherein said control means comprises an R-bit adder for forming the sum of the signals representing the R least significant bits of said modulo-N counter and the contents of said modulo-R counter, said adder also comprising means for generating an overflow signal, and second control means responsive to said overflow signal for reversing the significance of said $\log_2(N/R)$ most significant bits of said modulo-N counter.

10. Apparatus according to claim 9 wherein said second control means also comprises means responsive to said first output address signals for reversing the significance of said $\log_2(N/R)$ bits.

11. Apparatus according to claim 10 for combining said first and second output address signals, thereby to form composite output address signals.

12. The machine method for generating sets of N output signal sequences each of which is a digits-reversed reordered version of a corresponding input signal sequence comprising the steps of A. generating a sequence of binary input address signals, said address signals indicating alternate R-address subsequences of addresses having a straight-sequential ordering and scrambled-within-quadrant ordering, B. storing each of said sequences in a memory having N locations, the locations for storing said sequences being determined by said sequence of input address signals, C. generating a sequence of binary output address signals which indicate addresses for which the N/R digits of greatest significance vary for sets of R consecutive addresses, and D. reading sets of N signals from locations in said memory in accordance with said sequence of output addresses.

13. The method of claim 12 wherein said step of generating said sequence of binary input addresses comprises (1) generating a sequence of clock signals at the desired input signal rate, (2) modulo-N/R counting said clock signals, thereby generating first count signals, (3) modulo-R counting the number of cycles occurring in said modulo-N/R counting of said clock signals, thereby generating first input address signals, and (4) selectively bit-reversing said first count signals in response to an indication of the number of cycles of said modulo-R counter, thereby generating second input address signals.

* * * * *